(12) United States Patent
Hoover et al.

(10) Patent No.: US 10,369,806 B2
(45) Date of Patent: Aug. 6, 2019

(54) UNIVERSAL PART GRIPPER WITH CONFORMABLE GRIPPER BALL WITH VACUUM ASSIST

(71) Applicant: XEROX CORPORATION, Norwalk, CT (US)

(72) Inventors: Linn C Hoover, Webster, NY (US); Erwin Ruiz, Rochester, NY (US); Jeffrey J Bradway, Rochester, NY (US); Paul M Fromm, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 218 days.

(21) Appl. No.: 15/645,189

(22) Filed: Jul. 10, 2017

(65) Prior Publication Data

US 2019/0009571 A1 Jan. 10, 2019

(51) Int. Cl.
*B41J 3/407* (2006.01)
*B25B 11/00* (2006.01)
*B25J 15/06* (2006.01)

(52) U.S. Cl.
CPC ............. *B41J 3/4073* (2013.01); *B25B 11/00* (2013.01); *B25J 15/0616* (2013.01)

(58) Field of Classification Search
CPC ...... B25B 11/00; B25J 15/0616; B41J 3/4073
See application file for complete search history.

(56) References Cited

U.S. PATENT DOCUMENTS

| | | | | |
|---|---|---|---|---|
| 3,245,710 A | * | 4/1966 | Begemann ................. | B66C 1/00 294/74 |
| 4,561,686 A | * | 12/1985 | Atchley ................. | B66C 1/0206 294/188 |
| 6,135,654 A | * | 10/2000 | Jennel ........................ | B41J 2/01 101/35 |
| 7,600,450 B2 | * | 10/2009 | Montgomery .......... | E21B 19/07 175/423 |
| 8,467,070 B2 | * | 6/2013 | Diefenbacher ........ | G01B 11/24 356/601 |
| 8,882,165 B2 | * | 11/2014 | Lipson ................. | B25J 15/0023 294/188 |
| 8,926,047 B2 | * | 1/2015 | LaCaze .................. | B41J 2/1752 101/40 |
| 9,623,570 B1 | * | 4/2017 | Krahn ................... | B25J 15/0023 |
| 9,701,064 B2 | * | 7/2017 | Donaldson ............. | B41J 3/4073 |
| 9,827,784 B1 | * | 11/2017 | Buchar .................. | A63B 45/02 |

(Continued)

FOREIGN PATENT DOCUMENTS

WO WO-2006082100 A1 * 8/2006 ............. B23Q 3/086

OTHER PUBLICATIONS

U.S. Appl. No. 15/163,880, filed May 25, 2016, and entitled System for Printing on Three-Dimensional (3D) Objects by Wayne A. Buchar et al.

*Primary Examiner* — Marc Carlson

(57) ABSTRACT

A universal object holder device for securing 3-D objects for printing on the objects includes one or more ball shaped conformable grippers filled with irregular-shaped granular material with the one or more ball shaped conformable grippers each possessing an integrated vacuum gripper extending through an outer surface thereof. The combination of ball and vacuum gripper enables the universal object holder device to pick up a wider range of objects including those whose diameter is larger than the diameter of each gripper ball.

20 Claims, 6 Drawing Sheets

(56) References Cited

U.S. PATENT DOCUMENTS

| | | | | |
|---|---|---|---|---|
| 9,925,799 | B1* | 3/2018 | Fromm | B41J 3/4073 |
| 10,087,020 | B1* | 10/2018 | Ruiz | B65G 47/91 |
| 2006/0033350 | A1* | 2/2006 | Besch | B25B 5/065 |
| | | | | 294/119.3 |
| 2010/0078953 | A1* | 4/2010 | Ban | B25J 15/0266 |
| | | | | 294/106 |
| 2013/0106127 | A1* | 5/2013 | Lipson | B25J 15/0023 |
| | | | | 294/189 |
| 2015/0272749 | A1* | 10/2015 | Amend, Jr. | B25J 15/08 |
| | | | | 623/64 |
| 2015/0273864 | A1* | 10/2015 | Moehringer | B41J 11/002 |
| | | | | 347/16 |
| 2016/0339551 | A1* | 11/2016 | Morihara | B23Q 3/086 |
| 2017/0072572 | A1* | 3/2017 | Wagner | B25J 15/0616 |
| 2018/0281199 | A1* | 10/2018 | Bradway | B25J 15/0023 |
| 2018/0281464 | A1* | 10/2018 | Bradway | B41J 3/4073 |
| 2018/0281465 | A1* | 10/2018 | Liu | B41J 3/4073 |
| 2019/0009572 | A1* | 1/2019 | Hoover | B41J 3/4073 |

* cited by examiner

UNIVERSAL PART GRIPPER WITH CONFORMABLE GRIPPER BALL WITH VACUUM ASSIST

CROSS REFERENCE TO RELATED APPLICATIONS

Cross-referenced is commonly assigned U.S. application Ser. No. 15/477,127, filed Apr. 3, 2017, and entitled APPARATUS FOR HOLDING DURING THREE-DIMENSIONAL (3D) OBJECTS DURING PRINTING THEREON by Jeffrey J. Bradway et al, now U.S. Pat. No. 9,925,726; U.S. application Ser. No. 15/477,125, filed Apr. 3, 2017, and entitled VACUUM TUBE OBJECT CLAMPING ARRAY WITH CONFORMABLE PADS by Timothy P. Foley et al, US Publication No. 2018-0281316, now allowed; U.S. application Ser. No. 15/477,126, filed Apr. 3, 2017, and entitled UNIVERSAL PART GRIPPER WITH CONFORMABLE TUBE GRIPPERS by Linn C. Hoover et al, now US Publication No. 2018-0282086; U.S. application Ser. No. 15/477,427, filed Apr. 3, 2017, and entitled SPRING LOADED SUCTION CUP ARRAY GRIPPER by Paul M. Fromm et al, now U.S. Pat. No. 10,279,456; U.S. Application Ser. No. 62/480,563, filed Apr. 3, 2017, now expired and Ser. No. 15/626,200, filed Jun. 19, 2017, and entitled UNIVERSAL OBJECT HOLDER FOR 3-D PRINTING USING A CONFORMABLE GRIPPER BALL by Erwin Ruiz et al, now U.S. Pat. No. 10,870,020; U.S. application Ser. No. 15/477,439, filed Apr. 3, 2017, and entitled UNIVERSAL PART GRIPPER USING 3-D PRINTED MOUNTING PLATE by Linn C. Hoover et al, now US Publication No. 2018-0281306; U.S. application Ser. No. 15/477,454, filed Apr. 3, 2017, and entitled APPARATUS FOR GENERAL OBJECT HOLDING DURING PRINTING USING MULTIPLE CONFORMABLE BALLS by Jeffrey J. Bradway et al, now US Publication No. 2018-0281199; U.S. application Ser. No. 15/477,464, filed Apr. 3, 2017, and entitled AIR PRESSURE LOADED MEMBRANE AND PIN ARRAY GRIPPER by Paul M. Fromm et al, now U.S. Pat. No. 9,925,799; U.S. application Ser. No. 15/477,488, filed Apr. 3, 2017, and entitled APPARATUS FOR REPEATABLE STAGING AND HOLDING OBJECTS IN A DIRECT TO OBJECT PRINTER USING AN ARRAY OF PINS by Jeffrey J. Bradway et al, now US Publication No. 2018-0281464; U.S. application Ser. No. 15/477,478, filed Apr. 3, 2017, and entitled SPRING LOADED IRIS MECHANISM STACK GRIPPER by Paul M. Fromm et al, now U.S. Pat. No. 10,086,518; and U.S. application Ser. No. 15/645,216, filed herewith, and entitled UNIVERSAL PART HOLDER WITH CONFORMABLE MEMBRANES by Linn C. Hoover et al, now U.S. Pat. No. 10,308,038; all of which are included in their entirety herein by reference.

TECHNICAL FIELD

This disclosure relates generally to a system for printing on three-dimensional (3-D) objects, and more particularly, to an apparatus adapted for general object holding in a non-production environment.

BACKGROUND

Commercial article printing typically occurs during the production of the article. For example, ball skins are printed with patterns or logos prior to the ball being completed and inflated. Consequently, a non-production establishment, such as a distribution site, which customizes products, for example, in region in which potential product customers support multiple professional or collegiate teams, needs to keep an inventory of products bearing the logos of the various teams. Ordering the correct number of products for each different logo to maintain the inventory can be problematic.

One way to address these issues in non-production outlets would be to keep unprinted versions of the products, and print the patterns or logos on them at the distribution site. Adapting known printing techniques, such as two-dimensional (2-D) media printing technology, to apply image content onto 3-D objects would be difficult. Since the surfaces to be printed must be presented to the print heads as relatively flat, 2-D surfaces, the objects have to be maneuvered carefully to present portions of the articles as parallel planes to the print heads.

One printing system that accomplishes this is disclosed in copending and commonly assigned U.S. patent application Ser. No. 15/163,880, filed on May 25, 2016, and entitled SYSTEM FOR PRINTING ON THREE-DIMENSIONAL (3D) OBJECTS by Wayne A. Buchar et al, now U.S. Pat. No. 9,827,784. This printing system includes a plurality of print heads arranged in a 2-D array, each printhead being configured to eject marking material, a support member positioned to be parallel to a plane formed by the 2-D array of print heads, a member movably mounted to the support member, an actuator operatively connected to the movably mounted member to enable the actuator to move the moveably mounted member along the support member, an object holder configured to mount to the movably mounted member to enable the object holder to pass the array of print heads as the moveably mounted member moves along the support member, and a controller operatively connected to the plurality of print heads and the actuator, the controller being configured to operate the actuator to move the object holder past the array of print heads and to operate the plurality of print heads to eject marking material onto objects held by the object holder as the object holder passes the array of print heads. This application is included herein by reference for the practice of the present disclosure in its entirety.

A problem with this approach is that it requires the added cost of a unique part gripper for each part that is to be printed. Part grippers are currently machined metal brackets with dedicated locating and fastening features machined into each gripper. Customer productivity is impacted using these part grippers due to the time required to design and make a unique mounting plate for each part and the costs associated with each part gripper design. A standalone spherical shaped conformable gripper filled with granular material is shown in U.S. Pat. No. 8,882,165 used to pick and place objects and U.S. Pat. No. 7,600,450 shows curvature conformable gripping dies used in the oil industry that do not appear to be readily adaptable to holding objects for 3-D printing.

SUMMARY

In answer to this shortcoming, disclosed herein is a 3-D object holder plate comprising one or more ball shaped conformable grippers filled with irregular-shaped granular material with the one or more ball shaped conformable grippers each possessing an integrated vacuum gripper on the front face. The combination of ball and vacuum gripper enable the device to pick up a wider range of parts including those whose diameter is larger than the diameter of the gripper ball. The vacuum gripper assists in holding more securely any part the ball gripper can already hold. The vacuum gripper also assists in holding low curvature, flat plates or parts with minimal 3-D features on the back of the part. When the gripper unit is pressed against a part, both the ball gripper and the vacuum gripper conform to the surface to create a seal. When vacuum is applied to the balls internal cavity, the ball collapses against the granular material creating a semi-rigid support and the vacuum gripper applies a holding force to the part so that the part can be moved into position for printing and curing.

BRIEF DESCRIPTION OF THE DRAWINGS

The foregoing aspects and other features of a printing system that prints images on 3-D objects are explained in the following description, taken in connection with the accompanying drawings.

DETAILED DESCRIPTION

Figure 1:
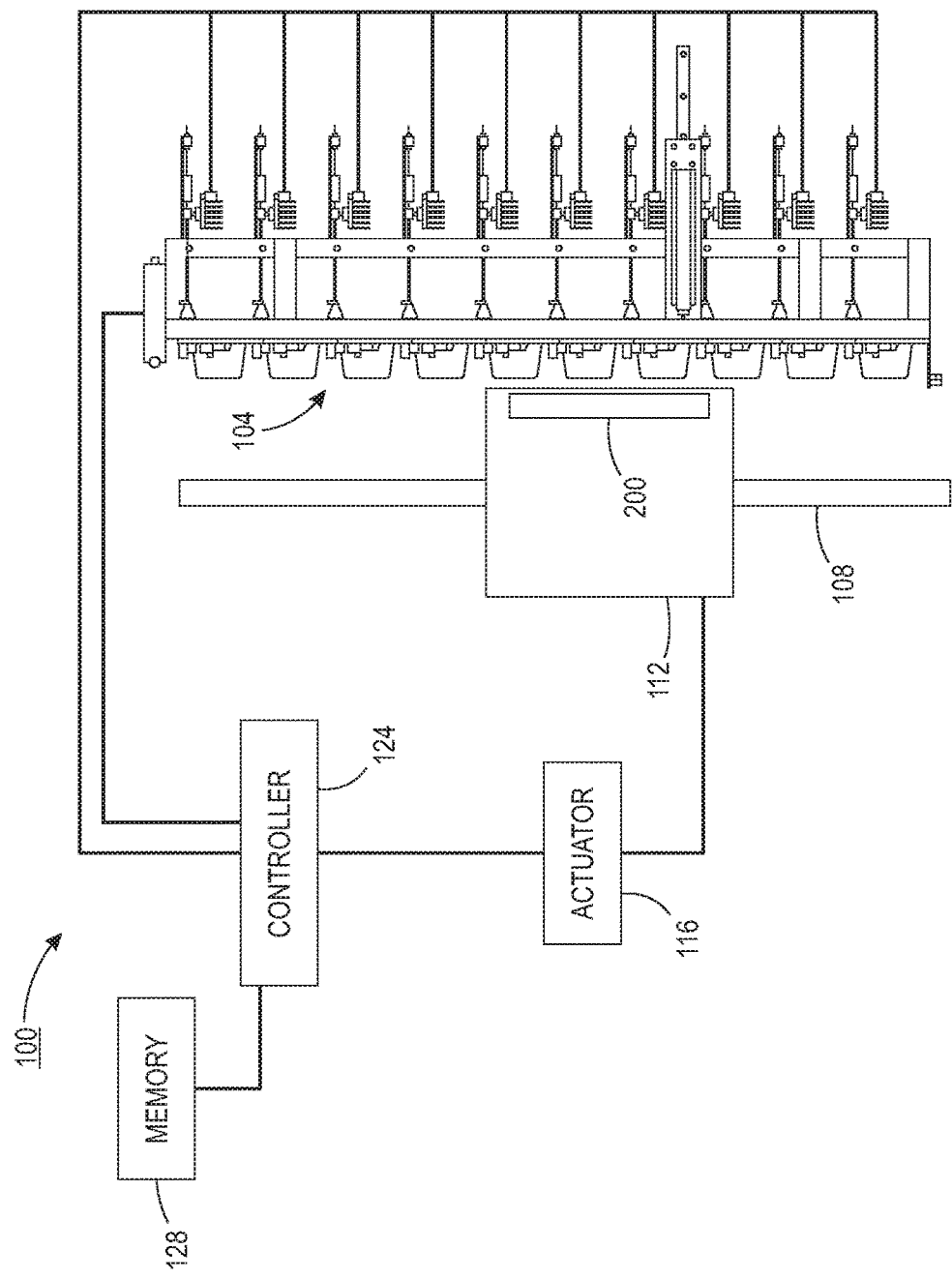
FIG. 1 illustrates an exemplary printing system 100 configured to print on a 3-D object.

For a general understanding of the present embodiments, reference is made to the drawings. In the drawings, like reference numerals have been used throughout to designate like elements.

FIG. 1 illustrates an exemplary printing system 100 configured to print on a 3-D object. The printing system 100 includes an array of print heads 104, a support member 108, a member 112 movably mounted to the support member 108, an actuator 116 operatively connected to the movably mounted member 112, a universal part holder 200 in block form that is configured to mount to the movably mounted member 112, and a controller 124 operatively connected to the plurality of print heads and the actuator. Universal part holder 200 is shown in detail in FIGS. 3 and 4. As shown in FIG. 1, the array of print heads 104 is arranged in a 2-D array, which in the figure is a 10×1 array, although other array configurations can be used. Each print head is fluidly connected to a supply of marking material (not shown) and is configured to eject marking material received from the supply. Some of the print heads can be connected to the same supply or each printhead can be connected to its own supply so each printhead can eject a different marking material.

The support member 108 is positioned to be parallel to a plane formed by the array of print heads and is oriented so that one end of the support member 108 is at a higher gravitational potential than the other end of the support member. This orientation enables the printing system 100 to have a smaller footprint than an alternative embodiment that horizontally orients the array of print heads and configures the support member, movably mounted member, and object holder to enable the object holder to pass objects past the horizontally arranged print heads so the print heads can eject marking material downwardly on the objects.

The member 112 is movably mounted to the support member 108 to enable the member to slide along the support member. In some embodiments, the member 112 can move bi-directionally along the support member. In other embodiments, the support member 108 is configured to provide a return path to the lower end of the support member to form a track for the movably mounted member. The actuator 116 is operatively connected to the movably mounted member 112 so the actuator 116 can move the moveably mounted member 112 along the support member 108 and enable universal part holder 200 connected to the moveably mounted member 112 to pass the array of print heads 104 in one dimension of the 2-D array of print heads.

The controller 124 is configured with programmed instructions stored in a memory 128 operatively connected to the controller so the controller can execute the programmed instructions to operate components in the printing system 100. Thus, the controller 124 is configured to operate the actuator 116 to move the universal part holder 200 past the array of print heads 104 and to operate the array of print heads 104 to eject marking material onto objects held by the universal part holder 200 as the universal part holder passes the array of print heads 104.

Figure 2:
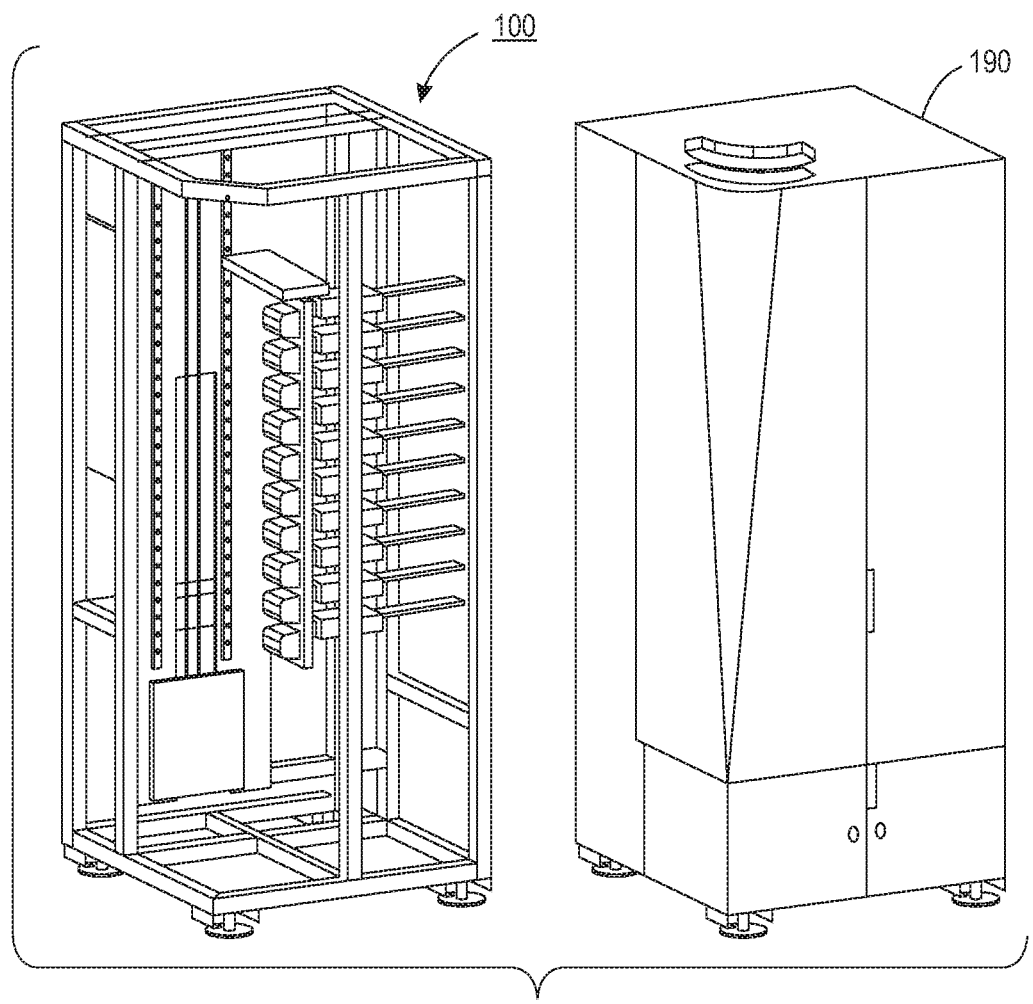
FIG. 2 depicts a cabinet within which the exemplary printing system 100 shown in FIG. 1 can be installed.

The system configuration shown in FIG. 1 is especially advantageous in a number of aspects. For one, as noted above, the vertical configuration of the array of print heads 104 and the support member 108 enables the system 100 to have a smaller footprint than a system configured with a horizontal orientation of the array and support member. This smaller footprint of the system enables the system 100 to be housed in a single cabinet 190, as depicted in FIG. 2, and installed in non-production outlets. Once installed, a universal part holder, as described further below, can be used with the system to print a variety of goods that are generic in appearance until printing is affixed.

Figure 3:
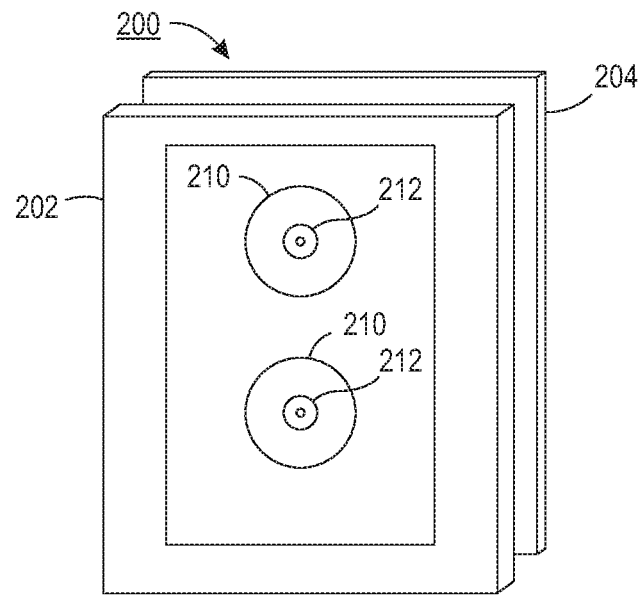
FIG. 3 illustrates a universal part holder that can be mounted into the printing system in FIG. 1 in accordance with the present disclosure.
Figure 4:
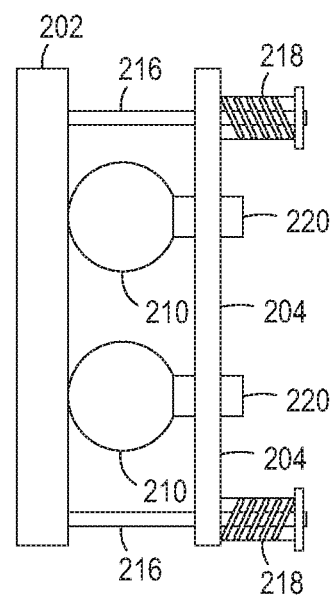
FIG. 4 depicts a side view of the universal part holder of FIG. 3.

Turning now to the present disclosure, a universal part holder 200 is shown in FIGS. 3 and 4 that includes a part holder plate 202 and a loading plate 204. Part holder plate 202 includes two spherical grippers 210 extending therethrough that are attached to loading plate 204 located behind part holder plate 202. Each conformable gripper ball 210 has an integrated vacuum gripper 212 on a front face to assist in capturing flat plates or parts with minimal 3-D features on the back of the part. The grippers 210 hold a part in holder plate 202 while universal part holder 200 is moved by movably mounted member 112 in FIG. 1 in front of print heads 104 jetting ink and subsequently past ink curing stations.

As shown in FIG. 4, part holder plate 202 includes two spherical grippers 210 that are attached by way of shafts 220 to loading plate 204 located behind part holder plate 202. Loading plate 204 is attached to the part holder plate 202 by four rods 216 and linear bearings biased towards part holder plate 202 by springs 218. Loading plate 204 and conformable gripper balls 210 are mounted to slide towards and away from the holder plate 202 by loading springs 218 in conjunction with moveably mounted member 112 shown in FIG. 1.

Figure 5A:
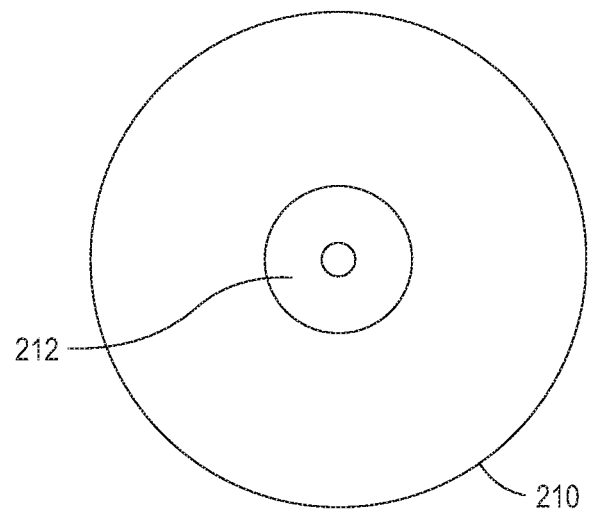
FIG. 5A is front view of a spherical gripper with an integrated vacuum gripper and FIG. 5B is a cross-section view of the spherical gripper of FIG. 5A.
Figure 5B:
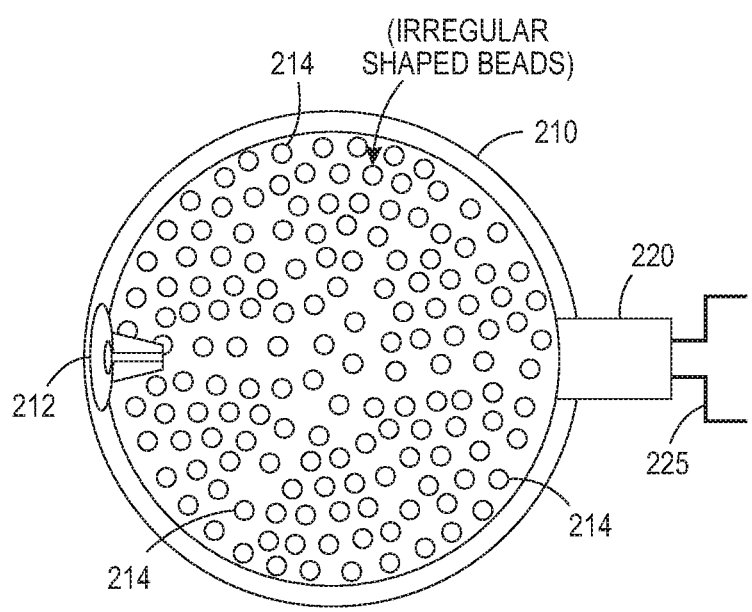

In FIGS. 5A and 5B, conformable gripper balls 210 are made from a flexible but impermeable material that is sealed to a spherical metal cup and vacuum port 220 on the back of conformable gripper balls 210. Conformable gripper balls 210 are filled with irregular shaped granular media, such as, small plastic beads 214 shown in FIG. 5B. The irregular shape of the small plastic beads 214 helps lock the beads together when vacuum from source 225 is applied to conformable gripper balls 210 through vacuum port 220 and atmospheric pressure compresses the covering material against the beads. Each conformable gripper ball 210 includes an integral elastomer vacuum gripper 212 in its front surface. Vacuum gripper 212 is actuated by the same vacuum source 225 as the gripper ball 210.

Figure 6A:
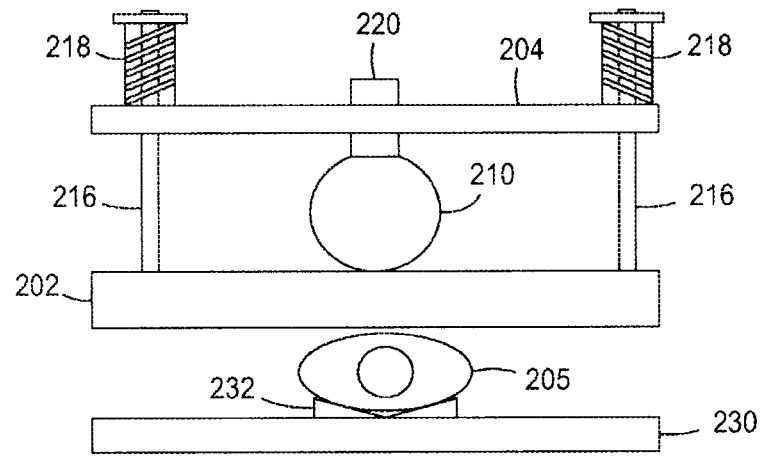
FIG. 6A illustrates a front view of the universal part holder in FIG. 4 in position to capture an object and FIG. 6B shows the generic part holder of FIG. 6A in contact with a part.
Figure 6B:
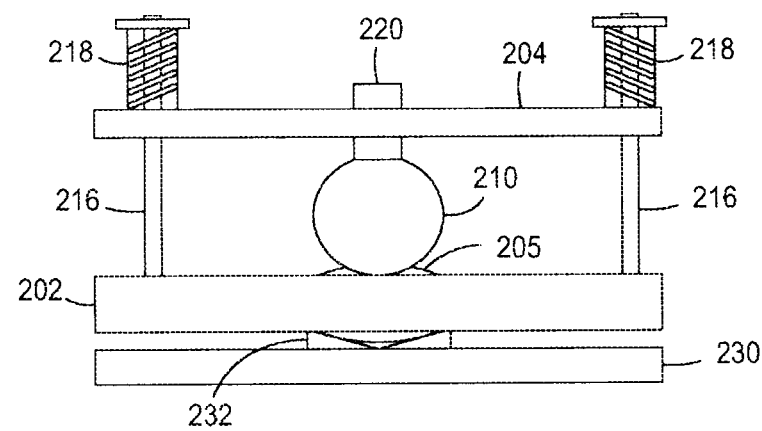
Figure 7:
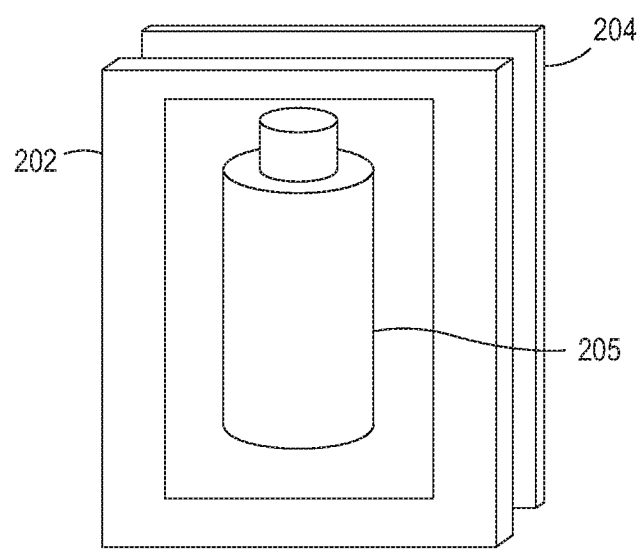
FIG. 7 shows the universal part holder of FIG. 3 with a part in position within it and held by a loading plate for receiving printing thereon.

In practice, a part 205 to be printed upon is placed onto support member 232 of part orientation fixture 230 in FIG. 6A to orientate and space part 205 relative to print heads 104 in FIG. 1. Part holder plate 202 is then positioned over part 205 and moved toward part orientation fixture 230 and part 205. The granular filled grippers 210 contact the part and are pressed against it by the loading springs 218. As conformable ball grippers 210 conform to the shape of part 205, the skirt surrounding vacuum grippers 212 in FIG. 5B also seals against the part. Vacuum is then applied from source 225 to conformable gripper balls 210. The integral gripper 212 seals to the part and vacuum develops inside the cavity of conformable gripper balls 210. The conformable gripper balls 210 collapse under atmospheric pressure and compresses the internal granular material 214 shown in FIG. 5B forming a semi-ridge support against the back of the part. Once conformable grippers 210 have conformed to the part and compacted the granular material, loading plate 204 is locked in place on rods 216 shown in FIG. 6B. Holder plate 202 and part 205 as shown in FIG. 7 is then moved into position parallel to print heads 104 for printing and curing the part.

It should be understood that conformable gripper balls with larger or smaller diameters, as well as, larger or smaller integral vacuum grippers can be interchanged based on a part's size, weight and surface features to optimize the retaining force on the part during printing.

In recapitulation, a universal part gripper for a direct-to-object printer includes a holder plate containing one or more ball shaped conformable grippers filled with granular material such as plastic beads. Each ball gripper has an integrated vacuum gripper on its front face to assist in capturing flat plates or parts with minimal 3-D features on the back of the object. The grippers hold the part in the holder plate while the plate moves the part in front of print heads jetting ink and subsequent ink curing stations.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A universal part holder, comprising:
   a part holder plate;
   at least one shaft mounted conformable gripper, said at least one shaft mounted conformable gripper including granular particles therein;
   a loading plate spaced a predetermined distance away from said part holder plate, said loading plate including at least one hole therein, and wherein said at least one shaft mounted conformable gripper is mounted within and extends orthogonally through said at least one hole in said loading plate;
   said loading plate is configured to be biased to move said at least one shaft mounted conformable gripper horizontally into and out of engagement with a part positioned within said part holder plate;
   a vacuum source for applying negative pressure into said at least one shaft mounted conformable gripper such that said granular particles within said at least one conformable gripper become semi-rigid and grips said part positioned within said part holder plate; and
   wherein said at least one shaft mounted conformable gripper includes at least one integrated vacuum gripper positioned within an outer surface portion of said at least one shaft mounted conformable gripper.

2. The universal part holder of claim 1, including a pair of shaft mounted conformable grippers.

3. The universal part holder of claim 1, wherein said loading plate is configured to be biased with springs.

4. The universal part holder of claim 3, wherein said granular particulates within said at least one shaft mounted conformable gripper are irregular in shape.

5. The universal part holder of claim 4, wherein said irregular shaped granular particles are beads.

6. The universal part holder of claim 5, wherein said beads are made of plastic.

7. The universal part holder of claim 5, wherein said universal part holder is placed within a printer that prints on 3-D parts.

8. The universal part holder of claim 1, wherein said integrated vacuum gripper is an elastomer.

9. A printer part holder for securely gripping parts for printing thereon, comprising:
   a holder plate;
   a loading plate and spacers separating said holder plate and loading plate a predetermined distance;
   collapsible spherical grippers loaded orthogonally within said loading plate and extending towards said holder plate, said collapsible spherical grippers including granular material therein;
   vacuum grippers integral with an outer surface of and extending into said collapsible spherical grippers; and
   a vacuum source adapted to apply a vacuum to said collapsible spherical grippers and collapse said collapsible spherical grippers under atmospheric pressure and thereby compress said granular material around a part while simultaneously forming a semi-rigid support against a back portion of the part.

10. The printer part holder of claim 9, wherein said vacuum grippers are made of an elastomer.

11. The printer part holder of claim 10, wherein said loading plate is biased towards said holder plate.

12. The printer part holder of claim 11, wherein said loading plate is biased towards said holder plate with springs.

13. The printer part holder of claim 12, wherein said granular material comprises irregular shaped beads.

14. The printer part holder of claim 13, wherein said irregular shaped beads are made of plastic.

15. A part holder for gripping a part for transfer to a predetermined location, comprising:
   a holder plate into which said part is placed;
   a loading plate having holes therein, said loading plate being spaced from and connected to said holder plate;
   a pair of spherical flexible grippers loaded orthogonally within said holes in said loading plate, said pair of spherical flexible grippers including granular material therein;
   wherein said loading plate and said pair of spherical flexible grippers configured to be biased to slide towards said holder plate;

vacuum grippers integral with an outer surface of and extending into said pair of spherical flexible grippers; and a vacuum source adapted to apply a vacuum to said pair of spherical flexible grippers and collapse said pair of spherical flexible grippers under atmospheric pressure to compress said granular material around a part and thereby forming a semi-ridge support against a back portion of said part.

16. The part holder of claim 15, wherein said granular material within said pair of spherical flexible grippers includes irregular shaped beads that facilitate locking of said irregular shaped beads together when vacuum is applied and atmospheric pressure compresses a covering material of said pair of spherical flexible grippers against said irregular shaped beads.

17. The part holder of claim 16, wherein said irregular shaped beads are made of plastic.

18. The part holder of claim 17, wherein said loading plate and said pair of spherical flexible grippers are configured to slide towards and away from said holder plate.

19. The part holder of claim 18, wherein said vacuum grippers are adapted to hold a 3-D part within said holder plate while configured to move said 3-D part in front of print heads of a printer that prints on said 3-D part.

20. The part holder of claim 19, wherein said pair of spherical flexible grippers are attached to said loading plate.

* * * * *